United States Patent
Belisomi et al.

(10) Patent No.: US 8,774,339 B2
(45) Date of Patent: Jul. 8, 2014

(54) NETWORK ELEMENT OF A COMMUNICATION NETWORK

(75) Inventors: Massimo Belisomi, Marcallo con Casone (IT); Alessandro Zecchi, Seriate (IT); Marzio Gerosa, Seregno (IT); Giorgio Claudio Mazzurana, Monza (IT)

(73) Assignee: Alcatel Lucent, Paris (FR)

( * ) Notice: Subject to any disclaimer, the term of this patent is extended or adjusted under 35 U.S.C. 154(b) by 75 days.

(21) Appl. No.: 13/510,448

(22) PCT Filed: Nov. 17, 2010

(86) PCT No.: PCT/EP2010/067692
§ 371 (c)(1),
(2), (4) Date: Jun. 25, 2012

(87) PCT Pub. No.: WO2011/072973
PCT Pub. Date: Jun. 23, 2011

(65) Prior Publication Data
US 2012/0257700 A1   Oct. 11, 2012

(30) Foreign Application Priority Data
Dec. 18, 2009   (EP) .................................... 09306275

(51) Int. Cl.
*H04L 7/04*   (2006.01)
(52) U.S. Cl.
USPC ........... 375/362; 375/316; 375/354; 375/356; 375/357
(58) Field of Classification Search
USPC ..................... 375/316, 362, 354, 356, 357
See application file for complete search history.

(56) References Cited

U.S. PATENT DOCUMENTS

| 7,242,867 B1* | 7/2007 | Clouinard ....................... 398/52 |
| 2001/0011313 A1 | 8/2001 | Hungerbuehler et al. |

(Continued)

FOREIGN PATENT DOCUMENTS

| EP | 2124474 | 11/2009 |
| JP | 11027297 A | 1/1999 |

(Continued)

OTHER PUBLICATIONS

A. Sinitsyn; A Synchronization Framework for Personal Mobile Servers; Pervasive Computing and Communications Workshops, 2004, Proceedings of the Second IEEE Annual Cnference ON, Piscataway, NJ, USA, IEEE; Mar. 14, 2004; pp. 208-212; XP010689755; ISBN: 978-0-695-2106-0.

(Continued)

*Primary Examiner* — Siu Lee
(74) *Attorney, Agent, or Firm* — Carmen Patti Law Group, LLC

(57) ABSTRACT

It is disclosed a network element for a communication network configured to synchronize its local clock to a reference clock signal. The network element comprises: a main board comprising an internal module configured to support an internal synchronization transport protocol, and a connector connected to the internal module; and a pluggable module configured to be removably connected to the connector. The pluggable module is configured to, when connected to the connector: exchange external synchronization information with a further network element, the external synchronization information being formatted according to an external synchronization transport protocol different from the internal synchronization transport protocol; exchange with the internal module internal synchronization information formatted according to the internal synchronization transport protocol; and interface the internal synchronization transport protocol and the external synchronization transport protocol.

15 Claims, 3 Drawing Sheets

(56) References Cited

U.S. PATENT DOCUMENTS

| | | | |
|---|---|---|---|
| 2011/0002429 A1* | 1/2011 | Williams et al. | 375/356 |
| 2011/0076945 A1* | 3/2011 | Chang et al. | 455/41.2 |

FOREIGN PATENT DOCUMENTS

| | | |
|---|---|---|
| JP | 2004120668 | 4/2004 |
| JP | 2007518322 | 7/2007 |
| JP | 2009146224 | 7/2009 |
| JP | 2002290492 | 10/2012 |
| WO | 2005/069520 | 7/2005 |

OTHER PUBLICATIONS

N. Farrington et al; Data Center Switch Architecture in the Age of Merchant Silicon; High Performance Interconnects, 2009, HOTI 2009; 17th IEEE Symposium ON, IEEE, Piscataway, NJ; USA; Aug. 25, 2009; pp. 93-102; XP031528533; ISBN: 978-0-7695-3847-1.

* cited by examiner

NETWORK ELEMENT OF A COMMUNICATION NETWORK

TECHNICAL FIELD

The present invention relates to the field of communication networks. In particular, the present invention relates to a network element of a communication network configured to synchronize its local clock to a reference clock signal of the communication network.

BACKGROUND ART

In a communication network, it is known to synchronize all the network elements to a reference clock signal. Typically, the synchronization is distributed in cascade, according to a master-slave scheme.

In particular, the synchronization is distributed in the form of synchronization information. When a network element receives the synchronization information from another network element, typically it processes them in order to synchronize its local clock, i.e. in order to set the frequency and/or the time of the day of its local clock equal to those of the reference clock signal. Therefore, the network element typically forwards the synchronization information to a further network element.

As known, different synchronization transport protocols can be implemented in order to transport the synchronization information in a communication network. In particular, layer 1 synchronization transport protocols (i.e. synchronization transport protocols wherein the synchronization information is transported at the physical layer of the ISO-OSI model) and layer 2 or 3 synchronization transport protocols (i.e. synchronization transport protocols wherein the synchronization information is transported at the data link and network layers of the ISO-OSI model) are known.

In the case of layer 1 synchronization transport protocols, the synchronization information may be in the form of an analog clock signal, a TDM frame stream (e.g. an E1 frame stream or a T1 frame stream) or a Synchronous Ethernet (SyncE) frame stream. In the first case (i.e. analog clock signal), a network element receiving the synchronization information typically directly uses the received analog clock signal to synchronize its local clock. In the second and third cases, (i.e. TDM frame stream or SyncE frame stream), the network element receives this frame stream and, typically by means of a clock recovery circuitry, it retrieves from the frame stream a clock signal that the network element successively uses to synchronize its local clock.

In the case of layer 2 or 3 synchronization transport protocols, the synchronization information is typically transported in the form of an asynchronous frame stream (e.g. an Ethernet frame stream) wherein each frame comprises a timestamp. An example of these protocols is the known IEEE 1588™-2008 protocol. In this case, a network element receiving an asynchronous frame stream comprising timestamps processes the timestamps and according to them it synchronizes its local clock.

Typically, a network element is configured to support one or more of the synchronization transport protocols cited above. For each supported synchronization transport protocol, the network element typically comprises on its main board a synchronization module which is configured to receive synchronization information in the form provided by that synchronization transport protocol from another network element, to process them in order to synchronize its local clock, and to forward the synchronization information to a further network element. Therefore, the network element typically comprises, on its main board, as many synchronization modules as the supported synchronization transport protocols.

For example, the main board of a network element may comprise a first synchronization module configured to support a first layer 1 synchronization transport protocol wherein the synchronization information are in the form of an analog clock signal, a second synchronization module configured to support a second layer 1 synchronization transport protocol wherein the synchronization information are in the form of a TDM frame stream, a third synchronization module configured to support a third layer 1 synchronization transport protocol wherein the synchronization information are in the form of a SyncE frame stream, and a fourth synchronization module configured to support a layer 2 synchronization transport protocol wherein the synchronization information are in the form of an asynchronous Ethernet frame stream comprising timestamps.

Besides, each synchronization module is provided with a respective cable connector suitable for engaging with a cable (e.g. optical fiber, coaxial cable, twisted pair, etc.) coming from another network element. Typical examples of such connectors are RJ45 connectors or 1.0/2.3 coaxial connectors.

SUMMARY OF THE INVENTION

The inventors have noticed that providing on the main board of the network element a number of synchronization modules equal to the number of synchronization transport protocols supported by the network element itself has some drawbacks.

Indeed, the network element typically uses only one synchronization module at a time. Therefore, disadvantageously, the space on the main board is not efficiently used, as a part of it is occupied by synchronization modules that, for most of the operation time of the network element, are not used.

Moreover, when a network operator wishes to make the network element able to support a new synchronization transport protocol (i.e. a synchronization transport protocol which has not a corresponding synchronization module on the main board), a new synchronization module has to be added on the main board. This disadvantageously implies that the main board has to be redesigned, both from the hardware and the firmware point of view. Moreover, this disadvantageously implies that the area on the main board which is dedicated to the synchronization increases each time a new synchronization transport protocol is added. In the meanwhile, the cost of the main board disadvantageously increases in proportion to the number of the synchronization modules that are present on the main board.

Besides, in the case of layer 1 synchronization transport protocols, if one wishes to modify the characteristics of the analog clock signal or of the TDM frame stream which transports the synchronization information (e.g. to modify the waveform or the frequency of the analog clock signal), the corresponding synchronization module must be disadvantageously modified. This disadvantageously may lead to the need of redesigning the whole main board.

Accordingly, the inventors have addressed the problem of providing a network element for a communication network configured to synchronize its local clock to a reference clock signal of the communication network, which overcomes the aforesaid drawbacks.

In particular, the inventors have addressed the problem of providing a network element for a communication network configured to synchronize its to local clock to a reference clock signal of the communication network, wherein the space on the main board is more efficiently used, and wherein it is possible to make the network element capable of supporting a new synchronization transport protocol without redesigning the main board.

According to a first aspect, some embodiments of the present invention is provide a network element for a communication network, the network element being configured to synchronize its local clock to a reference clock signal, the network element comprising:
- a main board comprising an internal module configured to support an internal synchronization transport protocol, and a connector connected to the internal module; and
- a pluggable module configured to be removably connected to the connector, the pluggable module being configured to, when connected to the connector:
  - exchange external synchronization information with a further network element of the communication network, the external synchronization information being formatted according to an external synchronization transport protocol different from the internal synchronization transport protocol;
  - exchange with the internal module internal synchronization information formatted according to the internal synchronization transport protocol; and
  - interface the internal synchronization transport protocol and the external synchronization transport protocol.

Preferably, the pluggable module is a small form-factor pluggable module.

Preferably, the connector is an small form-factor pluggable connector.

Preferably, the internal module is configured to, when the pluggable module is connected to the connector:
- generate egress internal synchronization information formatted according to the internal synchronization transport protocol and synchronous with the local clock of the network element; and
- transmit the egress internal synchronization information to the pluggable module through the connector.

Preferably, the pluggable module comprises a transmission portion configured to, when the pluggable module is connected to the connector:
- receive the egress internal synchronization information from the internal module through the connector;
- transduce the egress internal synchronization information into corresponding egress external synchronization information formatted according to the external synchronization transport protocol; and
- transmit the egress external synchronization information to the further network element of the communication network.

Preferably, the pluggable module comprises a reception portion configured to, when the pluggable module is connected to the connector:
- receive from the further network element ingress external synchronization information formatted according to the external synchronization transport protocol;
- transduce the ingress external synchronization information into corresponding ingress internal synchronization information formatted according to the internal synchronization transport protocol; and
- transmit the ingress internal synchronization information to the internal module through the connector.

Preferably, the internal module is further configured to, when the pluggable module is connected to the connector:
- receive the ingress internal synchronization information from the pluggable module through the connector; and
- processing the ingress internal synchronization information for synchronizing the local clock of the network element. Preferably, the internal module is configured to support the internal synchronization transport protocol operating at layer 1 of the ISO-OSI model, at layer 2 of the ISO-OSI model or at layer 3 of the ISO-OSI model.

Preferably, the pluggable module is configured to exchange the external synchronization information formatted according to the external synchronization transport protocol operating at layer 1 of the ISO-OSI model, at layer 2 of the ISO-OSI model or at layer 3 of the ISO-OSI model.

According to a second aspect, some embodiments of the present invention provide a communication network comprising a network element as set forth above.

According to a third aspect, some embodiments provide a pluggable module for a network element of a communication network, the network element comprising a main board comprising an internal module configured to support an internal synchronization transport protocol, and a connector connected to the internal module, wherein the pluggable module is configured to be removably connected to the connector, and the pluggable module is configured to, when connected to the connector:
- exchange external synchronization information with a further network element of the communication network, the external synchronization information being formatted according to an external synchronization transport protocol different from the internal synchronization transport protocol;
- exchange with the internal module internal synchronization information formatted according to the internal synchronization transport protocol; and
- interface the internal synchronization transport protocol and the external synchronization transport protocol.

Preferably, the pluggable module is a small form-factor pluggable module.

Preferably, the pluggable module comprises a transmission portion configured to, when the pluggable module is connected to the connector:
- receive egress internal synchronization information formatted according to the internal synchronization transport protocol from the internal module through the connector;
- transduce the egress internal synchronization information into corresponding egress external synchronization information formatted according to the external synchronization transport protocol; and
- transmit the egress external synchronization information to the further network element of the communication network.

Preferably, the pluggable module comprises a reception portion configured to, when the pluggable module is connected to the connector:
- receive from the further network element ingress external synchronization information formatted according to the external synchronization transport protocol;
- transduce the ingress external synchronization information into corresponding ingress internal synchronization information formatted according to the internal synchronization transport protocol; and
- transmit the ingress internal synchronization information to the internal module through the connector.

Preferably, the pluggable module is configured to exchange the external synchronization information formatted according to the external synchronization transport protocol operating at layer 1 of the ISO-OSI model, at layer 2 of the ISO-OSI model or at layer 3 of the ISO-OSI model.

BRIEF DESCRIPTION OF THE DRAWINGS

Embodiments of the invention will be better understood by reading the following detailed description, given by way of example and not of limitation, to be read with reference to the accompanying drawings, wherein.

DETAILED DESCRIPTION OF PREFERRED EMBODIMENTS OF THE INVENTION

Figure 1:
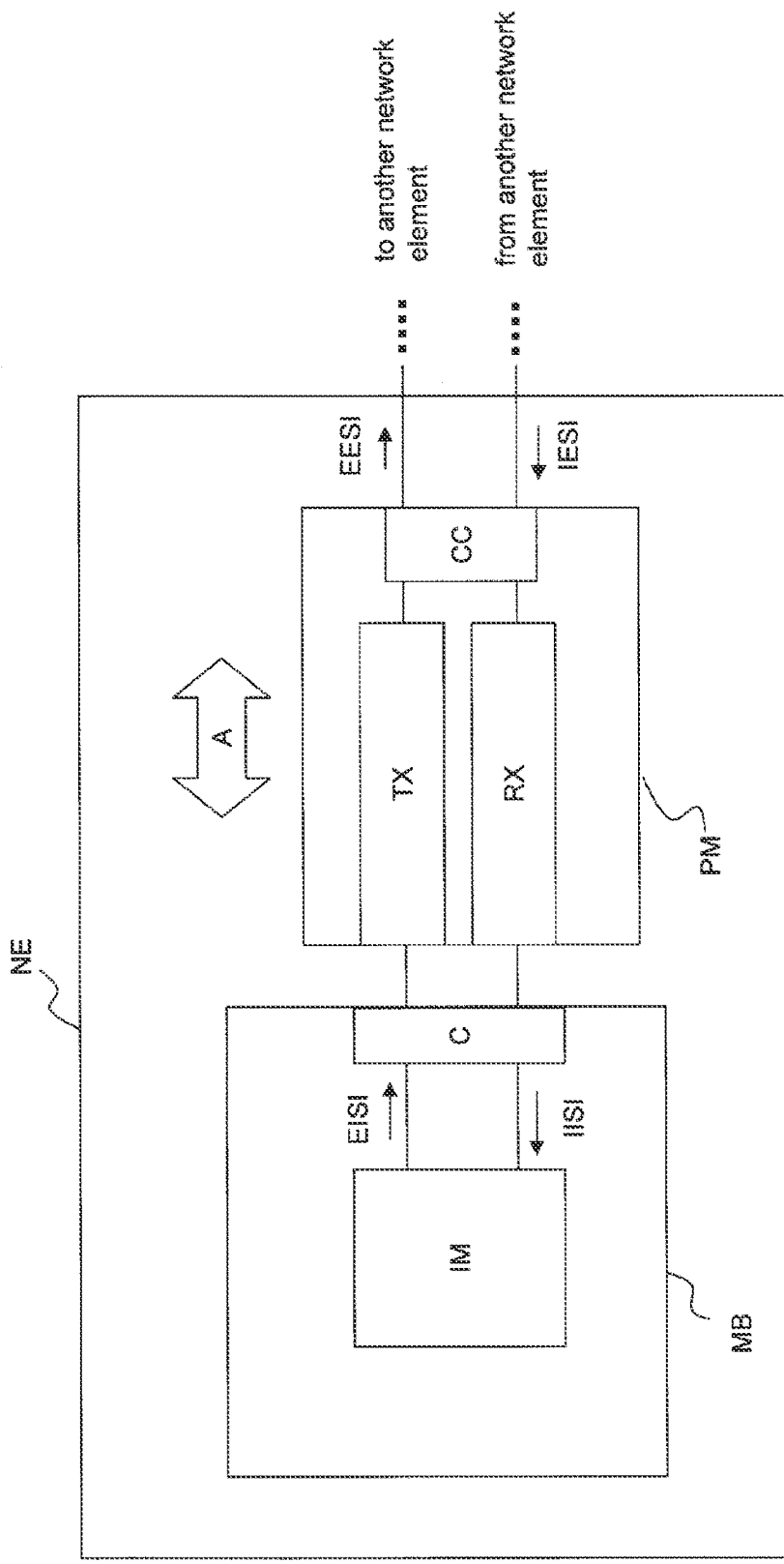
FIG. 1 schematically shows an exemplary network element of a communication network according to a preferred embodiment of the present invention.

FIG. 1 schematically shows a network element NE of a communication network not shown in the drawings.

According to a preferred embodiment of the present invention, the network element NE comprises a main board MB and a pluggable module PM. The network element NE may comprise other components that are not shown in FIG. 1 and that will not be described herein after, since they are not relevant to the present description.

The main board MB preferably comprises an internal module IM and a connector C connected to the internal module IM.

The internal module IM preferably comprises a programmable logic device. More preferably, the programmable logic device comprised in the internal module IM is a FPGA (Field Programmable Gate Array).

The connector C is preferably configured to engage with the pluggable module PM for removably connecting the pluggable module C to the main boad MB. The connector C preferably is a standard connector. More preferably, the connector C is an SFP connector.

The pluggable module PM preferably comprises a transmission portion TX, a reception portion RX, and a cable connection portion CC. The pluggable module PM is preferably adapted for being connected in a removable manner to the connector C of the main board MB, as schematically indicated by the arrow A in FIG. 1.

The pluggable module PM is preferably a standard pluggable module. More preferably, the pluggable module PM is a SFP (Small Form-factor Pluggable) module. This is advantageous, in that an SFP module has a particularly small size and is accordingly suitable for application in current network elements, that comprise a very high number of boards and circuits. Further, current network elements often are already equipped with SFP connectors suitable for engaging with SFP modules (e.g. for data transport). However, the pluggable module PM may be another standard pluggable module, such as for instance a PCMCIA (Personal Computer Memory Card International Association) card.

The pluggable module PM may comprise discrete analog components, and/or programmable logic devices (PLD) such as for instance FPGA. Alternatively, the pluggable module PM may comprise a dedicated integrated component such as an ASIC (Application Specific Integrated Circuit), a commercial integrated component or a micrologic component. Preferably, the pluggable device PM comprises a combination of the components mentioned above.

Preferably, the pluggable module may support a known $I^2C$ (Inter Integrated Circuit) function, i.e. it may be suitable for being connected to an $I^2C$ bus to other $I^2C$-supporting components residing on the main board MB. The $I^2C$ is function advantageously allows writing/reading information about the pluggable module PM. To this purpose, the information about the pluggable module PM may be stored either in a dedicated memory provided within the pluggable module PM and connected to the $I^2C$ bus. Preferably, the $I^2C$ bus is also connected to registers of possible configurable components of the pluggable module PM, for directly accessing them. This latter option is typically not supported by the known $I^2C$ function. Accordingly, the main board MB is preferably provided with dedicated hardware and software components configured to manage this latter option.

The cable connection portion CC preferably comprises one or more cable connectors (not shown in the drawings) configured to engage with one or more cables (e.g. optical fiber, coaxial cable, twisted pair, etc.) so as to connect the network element NE (and, in particular, the pluggable module PM) to a further network element of the communication network. When more connectors are provided, they can be of the same type or of different types.

The operation of the network element NE will be now described in detail, assuming that the pluggable module PM is plugged in the connector C.

According to a preferred embodiment of the present invention, the internal module IM is configured to support a synchronization transport protocol, which hereinafter will be referred to as "internal synchronization transport protocol". In other words, the internal module IN is preferably configured to receive, process and transmit synchronization information in the form provided by the internal synchronization transport protocol. Moreover, preferably, the pluggable module PM is configured to interface the internal synchronization transport protocol with a further synchronization transport protocol, which hereinafter will be referred to as "external synchronization transport protocol". Preferably, the internal synchronization transport protocol is different from the external synchronization transport protocol. The internal synchronization transport protocol and the external synchronization transport protocol can be layer 1 synchronization transport protocols or layer 2 or 3 synchronization transport protocols.

More in particular, the reception portion RX of the pluggable module PM is configured to receive from the further network element (not shown in FIG. 1) through the cable connection portion CC synchronization information IESI in the form provided by the external synchronization transport protocol, that hereinafter are referred to as "ingress external synchronization information". Moreover, preferably the reception portion RX of the pluggable module PM is configured to transduce the ingress external synchronization information IESI into corresponding synchronization information IISI in the form provided by the internal synchronization transport protocol, that hereinafter are referred to as "ingress internal synchronization information". Preferably, the reception portion RX of the pluggable module PM is configured to transmit the ingress internal synchronization information IISI to the internal module IM through the connector C.

On the other hand, the internal module IM is configured to receive the ingress internal synchronization information IISI from the reception portion RX of the pluggable module PM through the connector C. Moreover, the internal module IM is preferably configured to process such ingress internal synchronization information IISI in order to synchronize the local clock (not shown in FIG. 1) of the network element NE.

Besides, the internal module IM is configured to generate synchronization information EISI in the form provided by the internal synchronization transport protocol, that hereinafter are referred to as "egress internal synchronization information", and to transmit them to the transmission portion TX of the pluggable module PM through the connector C.

On the other hand, the transmission portion TX of the pluggable module PM is configured to receive the egress internal synchronization information EISI from the internal module IM through the connector C. Moreover, the transmission portion TX of the pluggable module PM is configured to transduce the egress internal synchronization information EISI into corresponding synchronization information EESI in the form provided by the external synchronization transport protocol, that hereinafter are referred to as "egress external synchronization information". Preferably, the transmission portion TX of the pluggable module PM is configured to transmit the egress external synchronization information EESI to the further network element (not shown in FIG. 1) through the cable connection portion CC.

Advantageously, even if the main board MB (and, in particular, the internal module IM) is as such configured to receive, process and transmit synchronization information in the form provided by the internal synchronization transport protocol, the network element NE as a whole is able to receive, process and transmit synchronization information in the form provided by the external synchronization transport protocol, thanks to the interface function between external and internal synchronization transport protocols performed by the pluggable module PM.

Therefore, if the external synchronization transport protocol changes, it is possible to change configuration of the network element NE so that it becomes able to receive, process and transmit synchronization information in the form provided by the new external synchronization transport protocol by simply replacing the pluggable module PM with a further pluggable module configured to interface the internal synchronization transport protocol and the new external synchronization transport protocol. Advantageously, it is not therefore required any hardware and firmware modification of the main board MB.

Moreover this allows to save space on the main board MB of the network element NE, since it is no longer necessary to provide a different synchronization module for each synchronization transport protocol supported by the communication network. It is indeed sufficient providing the internal module IM on the main board MB, and providing a different pluggable module for each synchronization transport protocol supported by the communication network. According to the synchronization transport protocol that one wishes to use in order to synchronize the network element NE, the corresponding pluggable module is plugged into the connector C.

Also in the case that a network operator wishes to modify the characteristics of the analog clock signal or of the TDM frame stream that transports the synchronization information (e.g. to modify the waveform or the frequency of the analog clock signal), it is sufficient to modify the pluggable module PM, whereas no hardware and firmware modification is required of the main board MB.

Moreover advantageously, the pluggable module PM may be plugged or replaced without turning off the power supply of the main board MB ("hot plugging"). Therefore, when the network element NE requires synchronization, the pluggable module PM can be plugged into the connector C without stopping the operation of the main board MB. Moreover, when the external synchronization transport protocol changes or the characteristics of the external synchronization transport protocol change, the pluggable module PM can be replaced without stopping the operation of the main board MB. Therefore, the insertion/replacement of the pluggable module PM advantageously does not affect the normal operation of the network element NE.

Advantageously, when the connector C is a standard connector (e.g. an SFP connector), if no synchronization is required at the network element NE, the pluggable module PM can be replaced by a module adapted for data transferring and connected to the main board MB through the connector C. Therefore, the resources present on the main board MB are reusable in an efficient way.

Herein after, with reference to FIG. 2, the network element NE (and, in particular, the pluggable module PM) will be described in a first exemplary case. According the this first exemplary case, the internal synchronization transport protocol is a layer 1 synchronization transport protocol, wherein the synchronization information are in the form of a SyncE frame stream (possibly, idle SyncE frames), and the external synchronization transport protocol is a different layer 1 synchronization transport protocol, wherein the synchronization information are in the form of a TDM frame stream (e.g. an E1 frame stream or a T1 frame stream). Under these assumptions, the internal module IM of the main board MB preferably comprises an Ethernet interface having a component adapted for processing, at the physical layer, SyncE idle frames for synchronizing the local clock of the network element NE.

Figure 2:
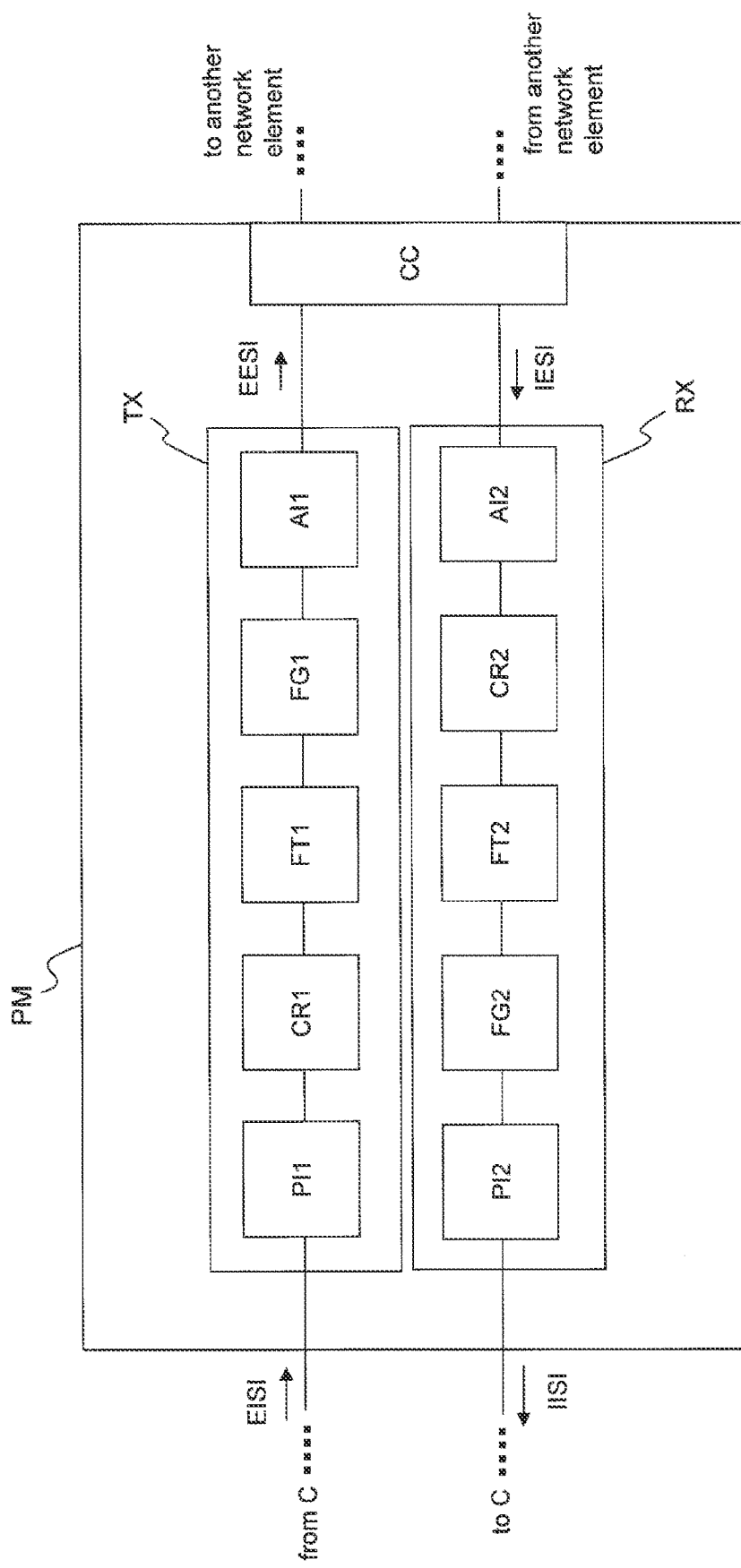
FIG. 2 shows in greater detail a pluggable module for the network element of FIG. 1, according to a first example.

As shown in FIG. 2, the transmission portion TX of the pluggable module PM preferably comprises a first physical interface PI1, a first clock recovery unit CR1, a first frequency translation unit FT1 (e.g. comprising a PLL circuit), a first frame generator FG1 and a first analog interface AI1, connected in cascade.

The reception portion RX of the pluggable module PM preferably comprises a second analog interface AI2, a second clock recovery unit CR2, a second frequency translation unit FT2 (e.g. comprising a PLL circuit), a second frame generator FG2 and a second physical interface PI2, connected in cascade.

The first physical interface PI1 and the second physical interface PI2 are preferably configured to cooperate with the connector C. Besides, the first analog interface AI1 and the second analog interface AI2 are preferably configured to cooperate with the cable connection portion CC.

The operation of the pluggable module PM of FIG. 2 will be now described in detail, assuming that the pluggable module PM is plugged in the connector C. The operation of the transmission portion TX and of its components mentioned above will be described first, assuming that the local clock of the network element NE is already synchronized to the reference clock signal of the communication network, and that the internal module IM generates (using the local clock) egress internal synchronization information EISI in the form of a SyncE idle frame stream for propagating synchronization. The generated SyncE idle frames are accordingly synchronous with the local clock of the network element NE. Preferably, the internal module IM transmits the egress internal synchronization information EISI to the transmission portion TX through the connector C.

The transmission portion TX preferably receives the egress internal synchronization information EISI coming from the internal module IM by means of the first physical interface PI1, that forwards it to the first clock recovery unit CR1. The first clock recovery unit CR1 preferably processes the SyncE idle frames of the egress internal synchronization information EISI for generating a first timing signal synchronous with the SyncE idle frames (and, accordingly, with the local clock of the network element NE) and having frequency f1. The frequency f1 is not necessarily equal to the frequency of the local clock of the network element NE. The frequency f1 is preferably the frequency that can be recovered most easily from the SyncE idle frames. Such frequency f1 can be, for example, 25 MHz or 125 MHz. The first timing signal is then sent to the first frequency translation unit FT1.

The first frequency translation unit FT1 preferably processes the first timing signal for generating a second timing signal with frequency f2 different from f1. Optionally, the second timing signal is phase locked to the first timing signal. Optionally, the first frequency translation unit FT1 may also filter the first timing signal so that the second timing signal is free from possible noise due to jitter and wander. The frequency f2 is selected for being compatible with the form of the synchronization information as provided by the external synchronization transport protocol. For instance, if according to the external synchronization transport protocol the TDM frames are E1 frames, the frequency f2 is substantially equal to 2.048 MHz, whereas if the TDM frames are T1 frames, the frequency f2 is substantially equal to 1.544 MHz.

The first frequency translation unit FT1 preferably sends the second timing signal to the first frame generator FG1. The first frame generator FG1 preferably uses the second timing signal to generate a TDM frame stream which is synchronous with said second timing signal, and which corresponds to the egress external synchronization information EESI. The first frame generator FG1 then sends the egress external synchronization information EESI thus generated to the first analog interface AI1, which in turn sends them to the further network element (not shown in FIG. 2) through the cable connection portion CC.

The operation of the reception portion RX and of its components mentioned above will be now described in detail, assuming that the pluggable module PM receives from the further network element (not shown in FIG. 2) through the cable connection portion CC ingress external synchronization information IESI in the form of a TDM frame stream synchronous with the reference clock signal of the communication network, and having frequency f2. For instance, in case the TDM frames are E1 frames, the frequency f2 may be equal to 2.048 MHz. Besides, in case the TDM frames are T1 frames, the frequency f2 may be equal to 1.544 MHz.

The ingress external synchronization information IESI are preferably received by the pluggable module PM through the second analog interface AI2.

The second analog interface AI2 preferably forwards the ingress external synchronization information IESI to the second clock recovery unit CR2. The second clock recovery unit CR2 preferably processes the TDM frames of the ingress external synchronization information IESI for generating a third timing signal with frequency f2. The second clock recovery unit CR2 preferably sends the third timing signal to the second frequency translation unit FT2.

The second frequency translation unit FT2 preferably processes the third timing signal for generating a fourth timing signal with frequency f1 different from f2. Optionally, the fourth timing signal is phase locked to the third timing signal. Optionally, the second frequency translation unit FT2 may also filter the third timing signal so that the fourth timing signal is free from possible noise due to jitter and wander. The frequency f1 is selected for being compatible with the form of the synchronization information as provided by the internal synchronization transport protocol. Since the internal synchronization transport protocol is SyncE, the frequency f1 can be, for example, equal to 25 MHz or 125 MHz.

The second frequency translation unit FT2 then preferably forwards the fourth timing signal to the second frame generator FG2. The second frame generator FG2 preferably uses the fourth timing signal to generate a SyncE idle frame stream which corresponds to the ingress internal synchronization information IISI. Moreover, preferably, the second frame generator FG2 forwards the ingress internal synchronization information IISI to the second physical interface PI2, that in turn forwards it to the internal module IM of the main board MB through the connector C.

The internal module IM then preferably processes, at the physical layer, the SyncE idle frames of the ingress internal synchronization information IISI in order to synchronize the local clock of the network element NE.

Therefore, advantageously, even if the main board MB is configured to receive, process at the physical layer, and transmit synchronization information in the form of a SyncE idle frame stream, the network element NE as a whole is able to receive, process and transmit synchronization information in the form of a TDM frame stream, thanks to the pluggable module PM which transduces the SyncE idle frame stream into a TDM frame stream, and viceversa.

Advantageously, when a network operator wishes that the network element NE becomes able to support transmission, processing and reception of synchronization information formatted according to another external synchronization transport protocol (e.g. a layer 2 synchronization transport protocol such as the IEEE 1588™-2008 protocol), it is sufficient to remove the pluggable module PM from the connector C and to replace it with another pluggable module able to transduce the SyncE idle frame stream into an Ethernet frame stream compliant with the IEEE 1588™-2008 protocol, and viceversa. Therefore, advantageously, no hardware and firmware modification is required on the main board MB.

Similarly, when a network operator wishes that the network element NE becomes able to support transmission, processing and reception of synchronization information in the form of an analog clock signal, it is sufficient to remove the pluggable module PM from the connector C and to replace it with another pluggable module able to transduce the SyncE idle frame stream into an analog clock signal, and viceversa. Differently from the pluggable module PM shown in FIG. 2, this another pluggable module does not comprise the first frame generator FG1 in its transmission portion TX (i.e. the first frequency translation unit FT1 is directly connected to the first analog interface AI1), and does not comprise the second clock recovery unit CR2 in its reception portion RX (i.e. the second analog interface AI2 is directly connected to the second frequency translation unit FT2). Accordingly, in the transmission portion TX, the second timing signal generated by the first frequency translation unit FT1 substantially corresponds to the egress external synchronization information EESI, and is accordingly transmitted by the first analog interface AI1 without any further processing. Similarly, in the reception portion RX, the second analog interface AI2 preferably forwards the analog clock signal (that corresponds to the ingress external synchronization information IESI) directly to the second frequency translation unit FT2.

Herein after, with reference to FIG. 3, the network element NE (and, in particular, the pluggable module PM) will be described in a second exemplary case. According to this second exemplary case, the internal synchronization transport protocol is a layer 2 synchronization transport protocol (e.g. the IEEE 1588™-2008 protocol), and the external synchronization transport protocol is a layer 1 synchronization transport protocol wherein the synchronization information are transported in the form of a TDM frame stream (e.g. E1 or, alternatively, T1 frames). Under these assumptions, the internal module IM of the main board MB preferably comprises an Ethernet interface.

Figure 3:
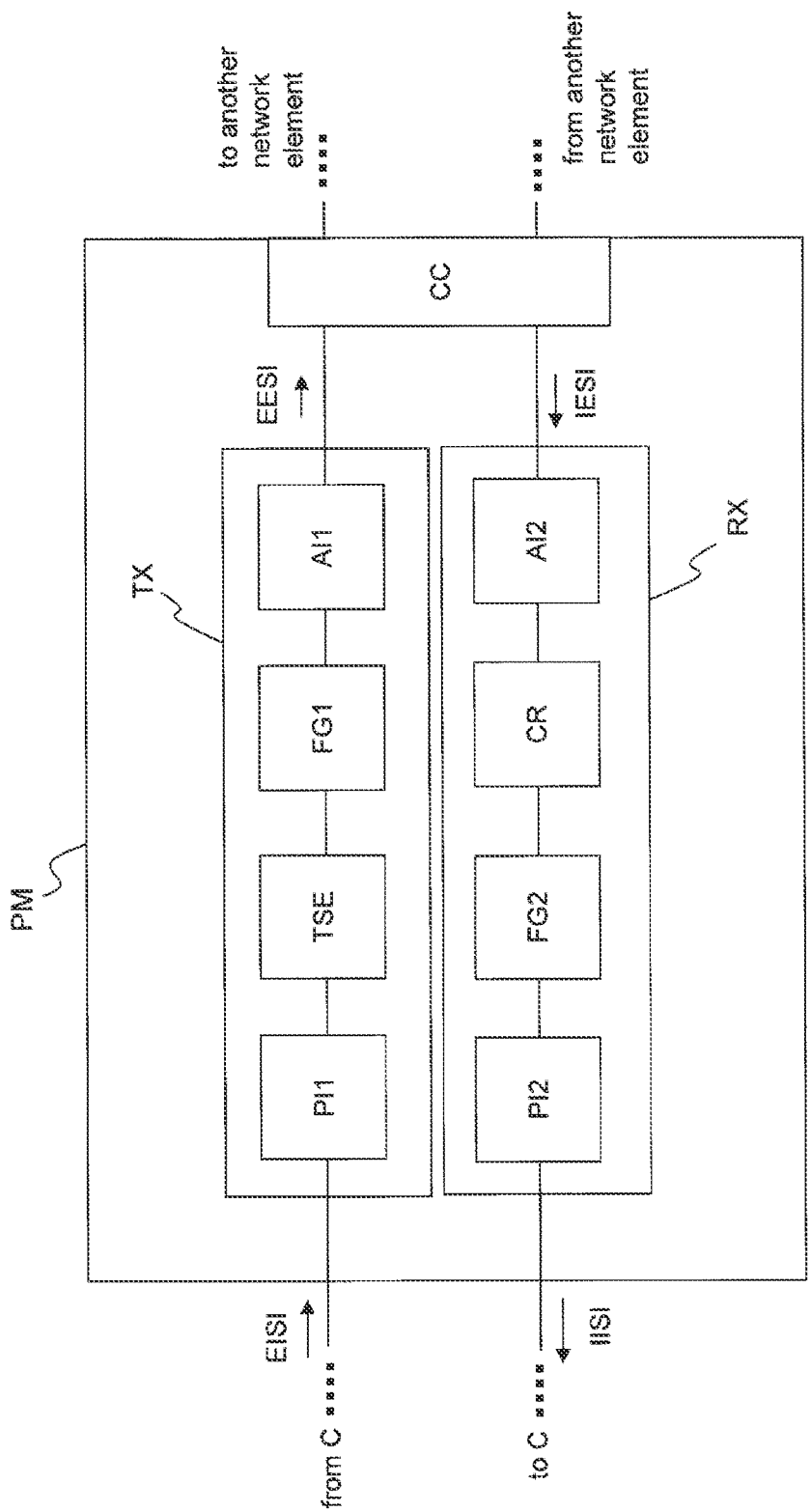
FIG. 3 shows in greater detail a pluggable module for the network element of FIG. 1, according to a second example.

As shown in FIG. 3, the transmission portion TX of the pluggable module PM preferably comprises a first physical interface PI1, a timestamp extractor TSE, a first frame generator FG1 and a first analog interface AI1 connected in cascade.

The reception portion RX of the pluggable module PM preferably comprises a second analog interface AI2, a clock recovery unit CR, a second frame generator FG2 and a second physical interface PI2 connected in cascade.

The first physical interface PI1 and the second physical interface PI2 are preferably configured to cooperate with the connector C. Besides, the first analog interface AI1 and the second analog interface AI2 are preferably configured to cooperate with the cable connection portion CC.

Preferably, the timestamp extractor TSE and the second frame generator FG2 are implemented as programmable logic devices. This advantageously increases design flexibility of the pluggable module PM.

The operation of the pluggable module PM of FIG. 3 will be now described in detail, assuming that the pluggable module PM is plugged in the connector C.

The operation of the transmission portion TX and of its components mentioned above will be described first, assuming that the local clock of the network element NE is already synchronized to the reference clock signal of the communication network, and that the internal module IM generates (using the local clock) egress internal synchronization information EISI in the form of an Ethernet frame stream compliant with IEEE 1588™-2008 protocol (i.e. comprising timestamps related to the local clock). Preferably, the internal module IM transmits the egress internal synchronization information EISI to the transmission portion TX of the pluggable module PM through the connector C.

The transmission portion TX preferably receives the egress internal synchronization information EISI coming from the internal module IM, and the first physical interface PI1 preferably processes, at the physical layer, the Ethernet frames of the egress internal synchronization information EISI. Then, preferably, the first physical interface PI1 forwards the egress internal synchronization information EISI to the timestamp extractor TSE.

The timestamp extractor TSE preferably processes, at layer 2, the Ethernet frames of the egress internal synchronization information EISI and extracts from them first timestamps. Using the first timestamps comprised in at least two successive Ethernet frames, the timestamp extractor TSE preferably generates a first timing signal with frequency f1. The first timing signal is preferably synchronous with the local clock of the network element NE. However, the frequency f1 is not necessarily equal to the frequency of the local clock of the network element NE. The frequency f1 is selected for being compatible with the form of the synchronization information as provided by the external synchronization transport protocol. For instance, if according to the external synchronization transport protocol the TDM frames are E1 frames, the frequency f1 of the first timing signal is substantially equal to 2.048 MHz, whereas if the TDM frames are T1 frames, the frequency f1 of the first timing signal is substantially equal to 1.544 MHz.

Then, the timestamp extractor TSE preferably sends the first timing signal to the first frame generator FG1. The first frame generator FG1 preferably uses the first timing signal to generate a TDM frame stream synchronous with said first timing signal, and corresponding to the egress external synchronization information EESI.

The first frame generator FG1 then sends the egress external synchronization information EESI thus generated to the first analog interface AI1, which in turn forwards them to the further network element (not shown in FIG. 3) through the cable connection portion CC.

The operation of the reception portion RX and of its components mentioned above will be now described in detail, assuming that the pluggable module PM receives from the further network element (not shown in FIG. 3) through the cable connection portion CC ingress external synchronization information IESI in the form of a TDM frame stream synchronous with the reference clock signal of the communication network, having frequency f1. For instance, in case the TDM frames are E1 frames, the frequency f1 may be equal to 2.048 MHz. Besides, in case the TDM frames are T1 frames, the frequency f1 may be equal to 1.544 MHz.

The ingress external synchronization information IESI are preferably received by the pluggable module PM through the second analog interface AI2.

The second analog interface AI2 preferably forwards the ingress external synchronization information IESI to the clock recovery unit CR. The clock recovery unit CR preferably processes the TDM frame of the ingress external synchronization information IESI for generating a second timing signal with frequency f1. The clock recovery unit CR preferably sends the second timing signal to the second frame generator FG2.

The second frame generator FG2 preferably processes the second timing signal to generate second timestamps and generates Ethernet frames, each one comprising a respective second timestamp according to the IEEE 1588™-2008 protocol. These Ethernet frames correspond to the ingress internal synchronization information IISI.

Then, preferably, the second frame generator FG2 forwards the ingress internal synchronization information IISI to the second physical interface PI2, that processes the Ethernet frames at the physical layer, and forwards them to the internal module IM of the main board MB through the connector C.

The internal module IM then preferably processes the Ethernet frames (and, more particularly, the second timestamps contained therein) of the ingress internal synchronization information IISI in order to synchronize the local clock of the network element NE.

Therefore, advantageously, even if the main board MB is configured to receive, process and transmit synchronization information in the form of an Ethernet frame stream compliant with the IEEE 1588™-2008 protocol, the network element NE as a whole can receive, process and transmit synchronization information in the form of a TDM frame stream thanks to the pluggable module PM which transduces the Ethernet frame stream compliant with the IEEE 1588™-2008 protocol in a TDM frame stream and viceversa.

Advantageously, when a network operator wishes that the network element NE becomes able to support the transmission, processing and reception of synchronization information formatted according to another external synchronization transport protocol (e.g. a layer 1 synchronization transport protocol such as SyncE), it is sufficient to remove the pluggable module PM from the connector C and to replace it with a module able to transduce the Ethernet frame stream compliant with the IEEE 1588™-2008 protocol in a SyncE frame stream and viceversa. Therefore, advantageously, also in this case it is not required any modification of the main board MB.

Similarly, when a network operator wishes that the network element NE becomes able to support transmission, processing and reception of synchronization information in the form of an analog clock signal, it is sufficient to remove the pluggable module PM from the connector C and to replace it with another pluggable module able to transduce the Ethernet frame stream compliant with the IEEE 1588™-2008 protocol into an analog clock signal, and viceversa. Differently from the pluggable module PM shown in FIG. 3, this another pluggable module does not comprise the first frame generator FG1 in its transmission portion TX (i.e. the timestamp extractor TSE is directly connected to the first analog interface AI1), and does not comprise the clock recovery unit CR in its reception portion RX (i.e. the second analog interface AI2 is directly connected to the second frame generator FG2). Accordingly, in the transmission portion TX, the first timing signal generated by the timestamp extractor TSE substantially corresponds to the egress external synchronization information EESI, and is accordingly transmitted by the first analog interface AI1 without any further processing. Similarly, in the reception portion RX, the second analog interface AI2 preferably forwards the analog clock signal (that corresponds to the ingress external synchronization information IESI) directly to the second frame generator FG2.

Although the above examples relate to cases wherein the pluggable module PM interfaces a layer 1 external synchronization transport protocol and a layer 1 or 2 internal synchronization transport protocol, this is merely exemplary. According to examples not shown in the drawings and not described in the present application, both the internal synchronization transport protocol and the external synchronization transport protocol may be layer 2 protocols. In this case, the pluggable module may comprise, instead of the analog interfaces AI1, AI2, suitable interfaces configured to support transmission and reception of the synchronization information formatted according to the layer 2 external synchronization transport protocol.

The invention claimed is:

1. Network element for a communication network, said network element being configured to synchronize its local clock to a reference clock signal, said network element comprising:
 a main board comprising an internal module configured to support an internal synchronization transport protocol, and a connector connected to said internal module; and
 a pluggable module configured to be removably connected to said connector, said pluggable module being configured to, when connected to said connector:
  exchange external synchronization information with a further network element of said communication network, said external synchronization information being formatted according to an external synchronization transport protocol different from said internal synchronization transport protocol;
  exchange with said internal module internal synchronization information formatted according to said internal synchronization transport protocol; and
  interface said internal synchronization transport protocol and said external synchronization transport protocol.

2. The network element according to claim 1, wherein said pluggable module is a small form-factor pluggable module.

3. The network element according to claim 2, wherein said connector is an small form-factor pluggable connector.

4. The network element according to claim 1, wherein the internal module is configured to, when said pluggable module is connected to said connector:
 generate egress internal synchronization information formatted according to said internal synchronization transport protocol and synchronous with said local clock of said network element; and
 transmit said egress internal synchronization information to said pluggable module through said connector.

5. The network element according to claim 4, wherein said pluggable module comprises a transmission portion configured to, when said pluggable module is connected to said connector:
 receive said egress internal synchronization information from said internal module through said connector;
 transduce said egress internal synchronization information into corresponding egress external synchronization information formatted according to said external synchronization transport protocol; and
 transmit said egress external synchronization information to said further network element of said communication network.

6. The network element according to claim 1, wherein said pluggable module comprises a reception portion configured to, when said pluggable module is connected to said connector:
 receive from the further network element ingress external synchronization information formatted according to said external synchronization transport protocol;
 transduce said ingress external synchronization information into corresponding ingress internal synchronization information formatted according to said internal synchronization transport protocol; and
 transmit said ingress internal synchronization information to said internal module through said connector.

7. The network element according to claim 6, wherein said internal module is further configured to, when said pluggable module is connected to said connector:
 receive said ingress internal synchronization information from said pluggable module through said connector; and
 processing said ingress internal synchronization information for synchronizing said local clock of said network element.

8. The network element according to claim 1, wherein said internal module is configured to support said internal synchronization transport protocol operating at layer 1 of the ISO-OSI model, at layer 2 of the ISO-OSI model or at layer 3 of the ISO-OSI model.

9. The network element according to claim 1, wherein said pluggable module is configured to exchange said external synchronization information formatted according to said external synchronization transport protocol operating at layer 1 of the ISO-OSI model, at layer 2 of the ISO-OSI model or at layer 3 of the ISO-OSI model.

10. A communication network comprising a network element according to claim 1.

11. A pluggable module for a network element of a communication network, said network element comprising a main board comprising an internal module configured to support an internal synchronization transport protocol, and a connector connected to said internal module, wherein said pluggable module is configured to be removably connected to said connector, and said pluggable module is configured to, when connected to said connector:
 exchange external synchronization information with a further network element of said communication network, said external synchronization information being formatted according to an external synchronization transport protocol different from said internal synchronization transport protocol;

exchange with said internal module internal synchronization information formatted according to said internal synchronization transport protocol; and interface said internal synchronization transport protocol and said external synchronization transport protocol.

12. The pluggable module according to claim 11, wherein said pluggable module is a small form-factor pluggable module.

13. The pluggable module according to claim 11, wherein said pluggable module comprises a transmission portion configured to, when said pluggable module is connected to said connector:

receive egress internal synchronization information formatted according to said internal synchronization transport protocol from said internal module through said connector;

transduce said egress internal synchronization information into corresponding egress external synchronization information formatted according to said external synchronization transport protocol; and transmit said egress external synchronization information to said further network element of said communication network.

14. The pluggable module according to claim 11, wherein said pluggable module comprises a reception portion configured to, when said pluggable module is connected to said connector:

receive from said further network element ingress external synchronization information formatted according to said external synchronization transport protocol;

transduce said ingress external synchronization information into corresponding ingress internal synchronization information formatted according to said internal synchronization transport protocol; and transmit said ingress internal synchronization information to said internal module through said connector.

15. The pluggable module according to claim 11, wherein said pluggable module is configured to exchange said external synchronization information formatted according to said external synchronization transport protocol operating at layer 1 of the ISO-OSI model, at layer 2 of the ISO-OSI model or at layer 3 of the ISO-OSI model.

* * * * *